US012754323B2

(12) United States Patent
Noh

(10) Patent No.: US 12,754,323 B2
(45) Date of Patent: Oct. 6, 2026

(54) METHOD FOR EXTRACTING OUTLINE OF BUILDING IN VEHICLE AND VEHICLE THEREOF

(71) Applicants: HYUNDAI MOTOR COMPANY, Seoul (KR); KIA CORPORATION, Seoul (KR)

(72) Inventor: Mi Rim Noh, Jeonju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 683 days.

(21) Appl. No.: 18/075,848

(22) Filed: Dec. 6, 2022

(65) Prior Publication Data

US 2024/0019580 A1 Jan. 18, 2024

(30) Foreign Application Priority Data

Jul. 14, 2022 (KR) ........................ 10-2022-0086854

(51) Int. Cl.
*G01S 17/931* (2020.01)
*B60R 11/00* (2006.01)

(52) U.S. Cl.
CPC ............. *G01S 17/931* (2020.01); *B60R 11/00* (2013.01)

(58) Field of Classification Search
CPC ............................... G01S 17/931; B60R 11/00
See application file for complete search history.

(56) References Cited

U.S. PATENT DOCUMENTS

2012/0032951 A1* 2/2012 Lee ...................... H04N 13/275 345/419
2021/0110199 A1 4/2021 Hunt
2022/0229186 A1* 7/2022 Lee ...................... G01S 7/4817

FOREIGN PATENT DOCUMENTS

| | | | |
|---|---|---|---|
| CN | 112666535 | A | 4/2021 |
| JP | 2017-150977 | A | 8/2017 |
| KR | 10-0963651 | B1 | 6/2010 |
| KR | 10-1767006 | B1 | 8/2017 |
| KR | 10-2275671 | B1 | 7/2021 |
| KR | 10-2022-0045703 | A | 4/2022 |

OTHER PUBLICATIONS

English translation of KR100963651B1 (Year: 2010).*
(Continued)

*Primary Examiner* — Andrew Schechter
*Assistant Examiner* — Ethan Wesley Edwards
(74) *Attorney, Agent, or Firm* — Morgan Lewis & Bockius LLP

(57) ABSTRACT

An object outline extracting method for a vehicle includes: as light detection and ranging (lidar) data is received, determining a reference point based on positions of points in global quadrants generated based on the vehicle and local quadrants generated based on a cluster box of an object, and detecting the object; extracting representative points of the points and outer points of the object; determining a position of a second point with respect to a first straight line connecting a first point and a third point among the outer points; and determining the second point as an outer point of the object or as a noise point based on the position of the second point with respect to the first straight line.

20 Claims, 14 Drawing Sheets

(56) References Cited

OTHER PUBLICATIONS

Douglas, David H. et al, "Algorithms for the reduction of the number of points required to represent a digitized line or its caricature," The Canadian Cartographer, vol. 10 No. 2, Dec. 1973 (Year: 1973).*

Strang, Gilbert, "Introduction to Linear Algebra," Fourth Ed., Wellesley-Cambridge Press, Published 2009 (Year: 2009).*

Zhang, Keqi et al, "Automatic Construction of Building Footprints From Airborne LIDAR Data," IEEE Transactions on Geoscience and Remote Sensing, vol. 44, No. 9, Sep. 2006 (Year: 2006).*

* cited by examiner

METHOD FOR EXTRACTING OUTLINE OF BUILDING IN VEHICLE AND VEHICLE THEREOF

This application claims priority to Korean Patent Application No. 10-2022-0086854, filed on Jul. 14, 2022 in Korean Intellectual Property Office, the entire contents of which is incorporated herein by reference in its entirety.

TECHNICAL FIELD

The present disclosure relates to a building outline extracting method for a vehicle and a vehicle thereof.

BACKGROUND

Safe autonomous driving of a vehicle may require a technology for accurately recognizing a surrounding environment, that is, nearby objects around the vehicle.

The vehicle may therefore include various sensing devices such as a camera, a radio detection and ranging (radar) sensor, and/or a light detection and ranging (lidar) sensor, and may employ a technology for detecting, tracking, and/or classifying objects around the vehicle based on data obtained through these sensing devices.

In the related art, when a vehicle recognizes a target object through lidar data received through a lidar sensor, a method of setting a center of a front bumper of the vehicle as a reference point and recognizing an object based on the reference point may be used. Such an existing object recognition technology may, however, have its limitation in extracting a precise outline when extracting an outline of a stationary object to recognize the stationary object.

For example, the related art has its limitation in extraction in that, when there is a tree in front of a building, a portion of the tree is extracted as an outline of the building. That is, the related art has its limitation in lidar data signal processing in that, in an environment where a building and a bush are mixed, the building and the bush are recognized as a single object.

In addition, the related art has its limitation in extracting a precise outline of a building due to point data that is reflected from an object inside the building as lidar data is transmitted through a glass window of the building.

SUMMARY

An aspect of the present disclosure is to provide a building outline extracting method for a vehicle and a vehicle thereof that may extract a highly reliable outline corresponding to a shape of a stationary object. Accordingly, it is possible to minimize an error in matching between an outline of a stationary object based on light detection and ranging (lidar) data and data of a precise map.

Additional aspects, advantages, and features of the present disclosure will be set forth in part in the description which follows and in part will become apparent to those having ordinary skill in the art upon examination of the following or may be learned from practice of the disclosure. The aspect and other advantages of the disclosure may be realized and attained by the structure particularly pointed out in the written description and claims hereof as well as the appended drawings.

To achieve the aspect described above, various embodiments are provided herein. According to an embodiment of the present disclosure, there is provided an object outline extracting method for a vehicle, including determining object points for an object from light detection and ranging (lidar) data received from a lidar sensor, determining a reference point based on positions of the object points in global quadrants of a vehicle coordinate system and in local quadrants of a local coordinate system, the vehicle coordinate system defined based on the vehicle and the local coordinate system defined based on a cluster box which encompasses the object points, and extracting outer points of the object from the object points based on the reference point.

The object outline extracting method may further include determining a first point, a second point, and a third point among the outer points, determining a position of the second point with respect to a first straight line connecting the first point and the third point, and determining the second point as a noise point based on the position of the second point with respect to the first straight line.

The object outline extracting method may further includes, when the object points are located within a global quadrant among the global quadrants, and are distributed in three quadrants among the local quadrants and are not in a remaining local quadrant within the global quadrant, determining, as a location of the reference point, a location of a point virtually located in the remaining local quadrant.

The object outline extracting method may further include, receiving the lidar data from a lidar sensor, and generating the cluster box through preprocessing and clustering of the lidar data.

The determining the object points for an object may include determining whether the object corresponds to a building with a height greater than or equal to a predetermined height.

The determining the reference point may be performed when the object points include points located higher than or equal to a predetermined height.

The determining the object points may include extracting representative points and the extracting the outer points may include extracting the outer points from the representative points based on the reference point, wherein the extracting the representative points may include changing a scan order of the object points such that points are sequentially extracted according to the scan order of the object points arranged at preset angular intervals in a counterclockwise direction, starting from the reference point among the object points in the global quadrant, and as the scan order changes, extracting the points arranged at the preset angular intervals in the counterclockwise direction as the representative points.

The determining the reference point and the detecting the object may be performed when the points are arranged with a distance greater than or equal to a preset distance in a Z-axis direction in a spatial coordinate system.

The determining the object points may include extracting representative points, wherein the extracting the representative points may include mapping, to each of the extracted representative points, an index number corresponding to an extraction order of a corresponding representative point, and the extracting the outer points includes extracting the outer points from the representative points.

The second point may be extracted as an outer point after being extracted as a representative point after the first point is extracted and before the third point is extracted, in the extracting the representative points from among the points.

The determining the position of the second point with respect to the first straight line may include calculating a dot product of a first vector indicated by rotating the first straight line by 90 degrees (°) and a second vector indicating a second straight line connecting the first point and the second point; when a result value of the dot product is a positive value, determining the position of the second point with respect to the first straight line as the inside of a first object, and when the result value of the dot product is a negative value, determining the position of the second point with respect to the first straight line as an outline part of the first object.

The determining the second point as the outer point or the noise point may include, when the position of the second point is determined as the inside of the first object, determining a first distance between the first straight line and the second point, when the first distance is less than a preset first threshold distance, determining the second point as the outer point, and when the first distance is greater than or equal to the preset first threshold distance, determining the second point as the noise point.

The object outline extracting method may further include calculating a ratio of first representative points to first outer points within a second threshold distance that is set according to positions of the first point and the third point; and when the ratio is greater than or equal to a preset threshold ratio, adding the first representative points as the outer points of the object.

The object outline extracting method may further include, when the second point is determined as the outer point, outputting the second point as the outer point of the object among the extracted outer points, and when the second point is determined as the noise point, deleting the second point from among the extracted outer points.

A vehicle of an exemplary embodiment of the present disclosure may include a lidar sensor and a controller connected in data communication to the lidar sensor, wherein the controller is configured to perform the object outline extracting method described above.

According to the example embodiments described herein, a building outline extracting method for a vehicle and a vehicle thereof may extract a highly reliable outline corresponding to a shape of a stationary object and may thereby minimize an error in matching between the outline of the stationary object and data of a precise map.

DETAILED DESCRIPTION OF THE DISCLOSURE

Figure 1:
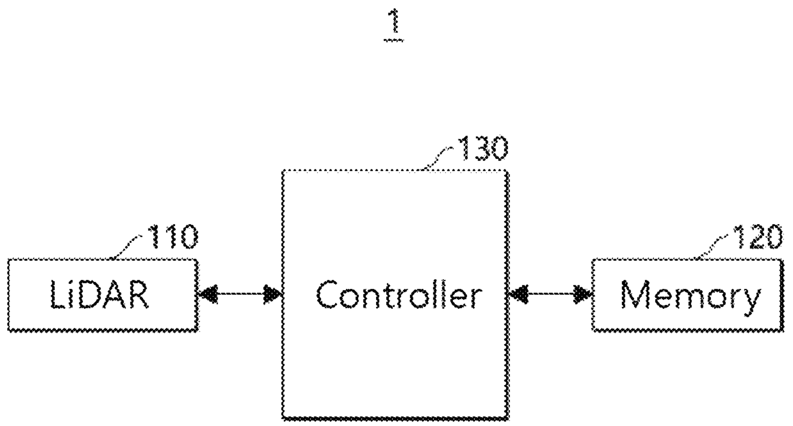
FIG. 1 is a block diagram illustrating an example of a vehicle according to an embodiment.

Hereinafter, embodiments of the present disclosure will be described in detail with reference to the accompanying drawings, and the same or similar elements will be given the same reference numerals regardless of reference symbols, and a redundant description thereof will be omitted. In the following description, the terms "module" and "unit" for referring to elements are assigned and used interchangeably in consideration of convenience of explanation, and thus the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. The accompanying drawings are used to help easily explain various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

When an element is described as being "coupled" or "connected" to another element, the element may be directly coupled or connected to the other element. However, it should also be understood that another element may be present therebetween. In contrast, when an element is described as being "directly coupled" or "directly connected" to another element, it should be understood that there are no other elements therebetween.

In the present specification, it should be understood that a term such as "include" or "have" is intended to designate the presence of features, numbers, steps, operations, elements, parts, or combinations thereof described in the specification, and does not preclude the possibility of addition or presence of one or more other features, numbers, steps, operations, elements, parts, or combinations thereof.

Although terms including ordinal numbers, such as "first," "second," etc., may be used herein to describe various elements, the elements are not limited by these terms. These terms are generally used to distinguish one element from another.

A singular expression includes the plural form unless the context clearly dictates otherwise.

Hereinafter, example embodiments will be described in detail with reference to the accompanying drawings. However, various alterations and modifications may be made to the embodiments. Here, the embodiments are not construed as limited to the disclosure and should be understood to include all changes, equivalents, and replacements within the idea and the technical scope of the disclosure.

The present disclosure relates to a technology for removing a point that is not a point representing the exterior of a building, in an environment where buildings and bushes are mixed around a vehicle and/or in a situation where a light detection and ranging (lidar) point transmitted through a window of a building by a lidar of the vehicle is reflected by an object. Accordingly, the present disclosure may provide a technology for extracting a highly reliable outline corresponding to a shape of a stationary object such as a building.

In the related art, to extract a nearby object (e.g., a nearby object outline) around a subject vehicle (simply referred to herein as a "vehicle"), a sorting algorithm and a convex hull algorithm may be used. These algorithms may include setting a center of the front bumper of the vehicle as an origin point of a coordinate system, extracting an outline of the nearby object of the vehicle, and determining the nearby object around the vehicle. However, when there is a tree around a building, for example, such an existing method may have its limitation in that it extracts an outline of the tree instead of the building.

In order to solve this imitation, the present disclosure provides a technology overcoming the limitation of the convex hull by varying a position of a reference point based on a point distribution for each of one or more objects of which points are arranged with a distance greater than or equal to a preset distance in a Z-axis direction of a coordinate system (or a spatial coordinate system or an XYZ coordinate system), and adding a nearest point as a point of an outline, even though it is determined as a noise point, based on the position of the reference point.

Hereinafter, the operational principle and embodiments of the present disclosure will be described with reference to the accompanying drawings.

FIG. 1 is a block diagram illustrating an example of a vehicle 1 according to an embodiment.

The vehicle 1 may include a light detection and ranging (lidar) 110, a memory 120, and/or a controller 130.

The lidar 110, which may be provided as a single lidar or a plurality of lidars and be mounted on the outside of a body of the vehicle 1, may emit a laser pulse toward an area around the vehicle 1 to generate lidar data, i.e., point data.

The memory 120 may store therein various sets of data used in at least one device of the vehicle 1, for example, input data and/or output data for a software program and commands related thereto.

For example, the memory 120 may store therein a software program for extracting an outline of an object, for example, a building, based on the lidar data obtained from the lidar 110.

The memory 120 may also store therein a convex hull algorithm used to extract an outline of an object, for example, a building. The convex hull algorithm is an existing technique in the related art, and thus a more detailed description thereof will be omitted here for conciseness.

The memory 120 may include a nonvolatile memory such as a cache, a read-only memory (ROM), a programmable ROM (PROM), an erasable PROM (EPROM), an electrically EPROM (EEPROM), and/or a flash memory, and/or a volatile memory such as a random-access memory (RAM).

The controller 130 (also referred to as a control circuit or a processor) may control at least one device (e.g., the lidar 110 and/or the memory 120) of the vehicle 1 and perform various data processing processes and operations. The controller 130 may include a processor and a memory.

According to an exemplary embodiment of the present disclosure, the controller 130 may include a processor (e.g., computer, microprocessor, CPU, ASIC, circuitry, logic circuits, etc.) and an associated non-transitory memory storing software instructions which, when executed by the processor, provides the functionalities of the controller 130. Herein, the memory and the processor may be implemented as separate semiconductor circuits. Alternatively, the memory and the processor may be implemented as a single integrated semiconductor circuit. The processor may embody one or more processor(s).

The controller 130 may define global quadrants and local quadrants, wherein the global quadrants are defined in a global coordinate system (e.g. a spatial coordinate system or a XYZ coordinate system) based on the vehicle 1 (referred to as 'a vehicle coordinate system') and the local quadrants are defined in a local coordinate system which is defined based on a cluster box of an object which may be determined as a box encompassing object points of the object. The object points (referred to as simply 'points') are obtained from the lidar data.

The controller 130 may determine a reference point according to positions of points, based on the cluster box of the object in the global quadrants and the local quadrants. For example, a first object may include an object having a point distribution in a shape (e.g. rectangular shape) of a building.

After determining the reference point, the controller 130 may rearrange an angle for the object.

After rearranging the angle for the object, the controller 130 may remove points located in an inward direction of the object.

In the case of the convex hull algorithm, a convex hull is drawn around the reference point and thus, when a position of the reference point is at an origin point, a noise point (e.g., a point indicating a tree) located outside of an object (e.g., a building) may be included as a point indicating an outline of the building. In addition, when the reference point is located inside a building, a noise point (e.g., a point reflected by an object inside the building after passing through a glass window of the building) may be included as a point (i.e. outer point) indicating the outline of the building. Accordingly, the controller 130 may remove points located inside the building based on the position of the reference point.

Figure 2:
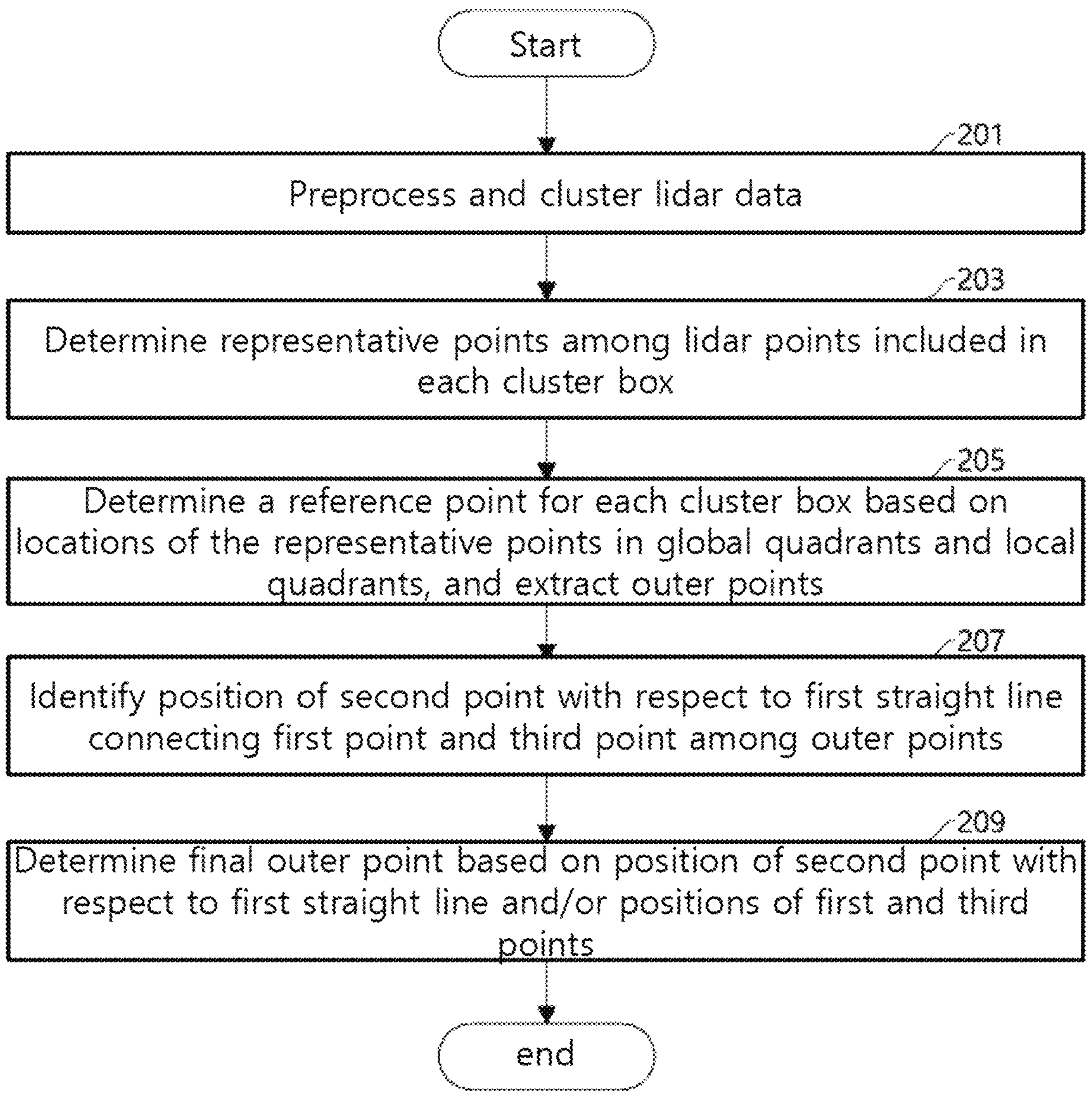
FIG. 2 is a flowchart illustrating an example of a building outline extracting method for a vehicle according to an embodiment.
Figure 3:
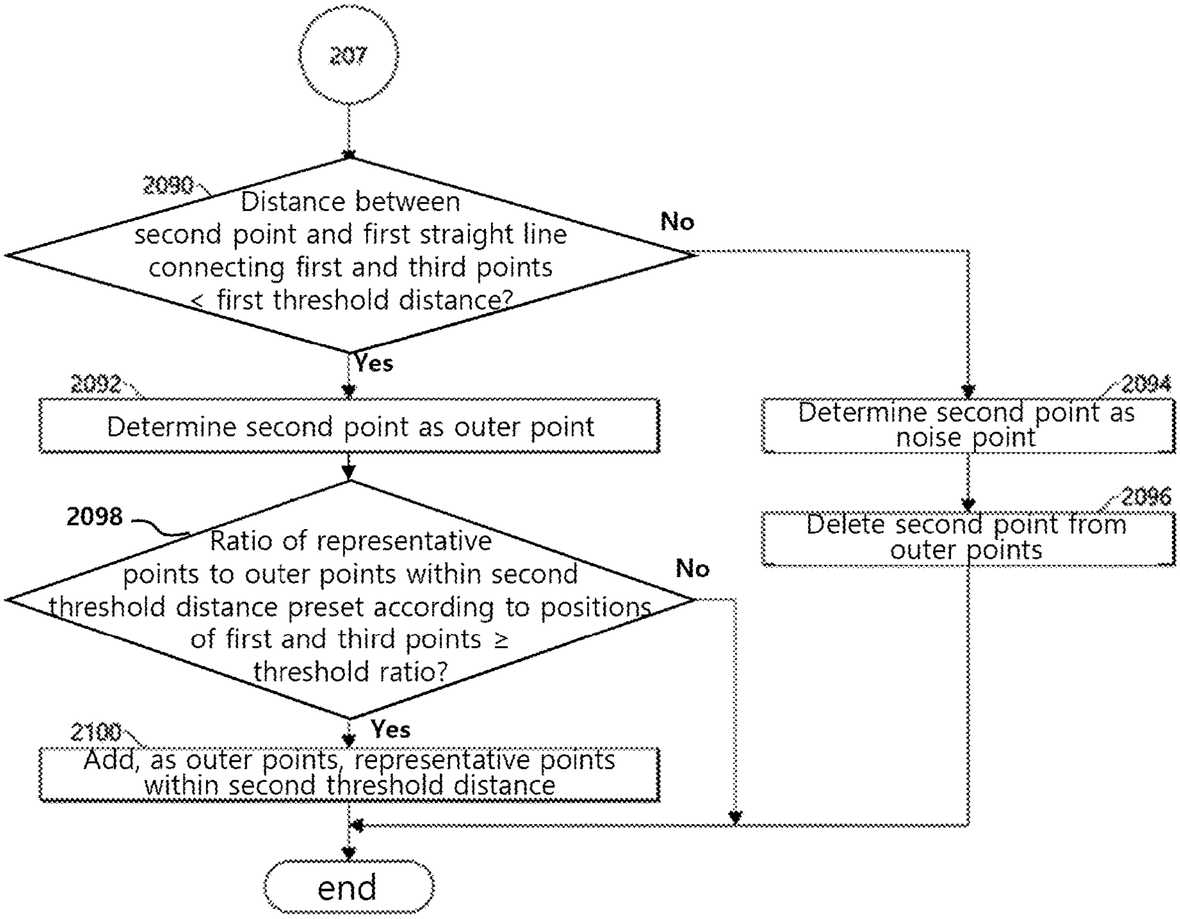
FIG. 3 is a flowchart illustrating a detailed example of determining an outer point of a vehicle according to the embodiment of FIG. 2.

FIG. 2 is a flowchart illustrating an example of a building outline extracting method of a vehicle (e.g., the vehicle 1 and/or the controller 130) according to an embodiment. FIG. 3 is a flowchart illustrating a detailed example of determining an outer point of a vehicle (e.g., the vehicle 1 and/or the controller 130) according to the embodiment of FIG. 2. FIGS. 4 through 7 are diagrams illustrating examples of extracting a building outline of a vehicle (e.g., the vehicle 1 and/or the controller 130) according to an embodiment.

Referring to FIG. 2, in process 201, the vehicle 1 may preprocess and cluster lidar data in the form of a point cloud that is received from the lidar 110.

The vehicle 1 may perform a preprocessing process to remove ground data from the lidar data, and perform clustering to group the preprocessed lidar data into a plurality of groups That is, the vehicle 1 may determine point clusters, each of which includes points considered to be associated to the same object, and generate a cluster box encompassing the points for each clusters.

Also, when points included in a cluster box are arranged over a preset height, i.e. over a preset value in a Z-axis direction of a spatial coordinate system, the vehicle 1 may determine the points as corresponding to an object of a predetermined or greater height.

In process 203, the vehicle 1 may determine representative points among those associated to respective cluster boxes each of which is determined, for example before the representative points being determined, to be an object of a predetermined or greater height. The representative points may be determined by selecting the nearest point from the vehicle 1 in each of evenly divided circular sectors with respect to an origin point of the vehicle 1.

In process 205, a reference point may be determined for each cluster box based on positions of the associated representative points in global quadrants and local quadrants.

For example, the global quadrants may be defined with respect to an origin point of the vehicle 1.

Figure 4:
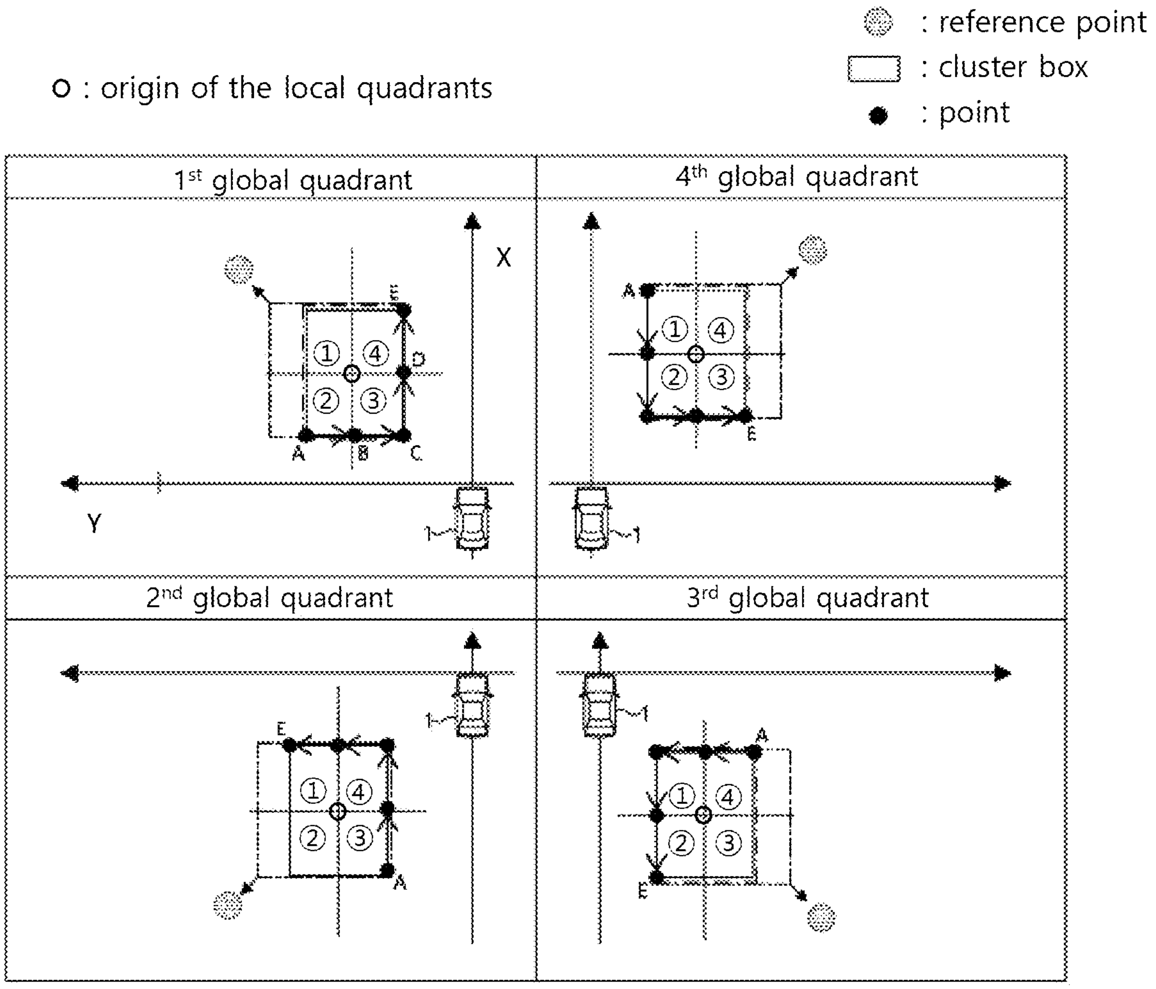
FIGS. 4 through 7A-7C are diagrams illustrating examples of extracting a building outline of a vehicle according to an embodiment.

For example, as shown in FIG. 4, the quadrant at the left front side of the vehicle 1 may be defined as a first global quadrant, the one at the left rear side as a second global quadrant, the one at the right rear side as a third global quadrant, and the one at the right front side as a fourth global quadrant.

The vehicle 1 may also define a plurality sets of local quadrants for respective cluster boxes. That is, a set of local quadrants may be defined for each of the cluster boxes, the origin of the local quadrants being located in the center of the corresponding cluster box.

For example, the vehicle 1 may define, in association with each cluster box, a set of local quadrants which include a first quadrant ①, a second quadrant ②, a third quadrant ③, and a fourth quadrant ④, with the origin of the local quadrants set at the center of the cluster box, as shown in FIG. 4.

Based on a distribution of the representative points in a set of local quadrants, the vehicle 1 may determine whether the object corresponds to a building. For example, the vehicle 1 may determine the object as a building when it is determined that the corresponding representative points are distributed in three quadrants of the corresponding local quadrants.

For example, in the first global quadrant in FIG. 4, when there are points in the second quadrant ②, the third quadrant ③, and the fourth quadrant ④ of the local quadrants, the vehicle 1 may determine the points to correspond to a building.

Similarly, in the second global quadrant, when there are points in the first quadrant ①, the third quadrant ③, and the fourth quadrant ④ of the local quadrants, the vehicle 1 may determine the points to correspond to a building.

And, in the third global quadrant, when there are points in the first quadrant ①, the second quadrant ②, and the fourth quadrant ④ of the local quadrants, the vehicle 1 may determine the points to correspond to a building.

Also, in the fourth global quadrant, when there are points in the first quadrant ①, the second quadrant ②, and the third quadrant ③ of the local quadrants, the vehicle 1 may determine the points to correspond to a building.

For each quadrant of the global quadrants, the vehicle 1 may determine, as the reference point for a cluster box (or the associated representative points) contained therein, a virtual point located in a quadrant of the local quadrants which does not contain any of the representative points.

For example, in the first global quadrant in FIG. 4, points are located in the second quadrant ②, the third quadrant ③, and the fourth quadrant ④, however, there is no point in the first quadrant ① of the local quadrants, thus the vehicle 1 may determine, as the reference point for the cluster box, a first point virtually located in the first quadrant W.

Similarly, in the second global quadrant in FIG. 4, the points are distributed only in the first quadrant ①, the third quadrant ③, and the fourth quadrant ④, thus the vehicle 1 may determine, as the reference point, a second point virtually located in the second quadrant ②.

Also, in the third global quadrant in FIG. 4, the points are only in the first quadrant ①, the second quadrant ②, and the fourth quadrant ④, thus the vehicle 1 may determine, as the reference point, a third point virtually located in the third quadrant ③.

And, in the fourth global quadrant in FIG. 4, the points are only in the first quadrant ①, the second quadrant ②, and the third quadrant ③, and thus the vehicle 1 may determine, as the reference point, a fourth point virtually located in the fourth quadrant ④.

Next, to extract outer points, which are considered to form an outline of an object, i.e. a building of a predetermined or greater height, from the representative points associated to a cluster box, the vehicle 1 may apply a predetermined program logic, e.g. a well-known convex hull algorithm to the representative points in counter-clockwise (CCW) direction with respect to the corresponding reference point.

For example, in the first global quadrant in FIG. 4, the vehicle 1 may extract outer points by applying the predetermined program logic in order of A, B, C, D and E.

Also, for example, in the second global quadrant in FIG. 4, the vehicle 1 may extract outer points by applying the program logic starting from the point A located in the third quadrant ③ up to the point E located in the first quadrant ①.

Similarly, for example, in the third global quadrant in FIG. 4, the vehicle 1 may extract outer points by applying the program logic starting from the point A located in the fourth quadrant ④ up to the point E located in the second quadrant ②.

Also, for example, in the fourth global quadrant in FIG. 4, the vehicle 1 may extract outer points by applying the program logic starting from the point A located in the first quadrant ① up to the point E located in the third quadrant ③.

Next, after the outer points being extracted for each building, the outer points are checked whether they are appropriate to form the outline of the building, and the determinations of the outer points are finalized in proceses 207 and 209.

In process 207, for each outer point to verify the validity thereof, the vehicle 1 may check whether it is located inside, i.e. at the side of the center of the corresponding cluster box, or outside, i.e. at the opposite side, with respect to a straight line connecting the sequentially immediately-adjacent outer points verified as valid.

Figure 5:
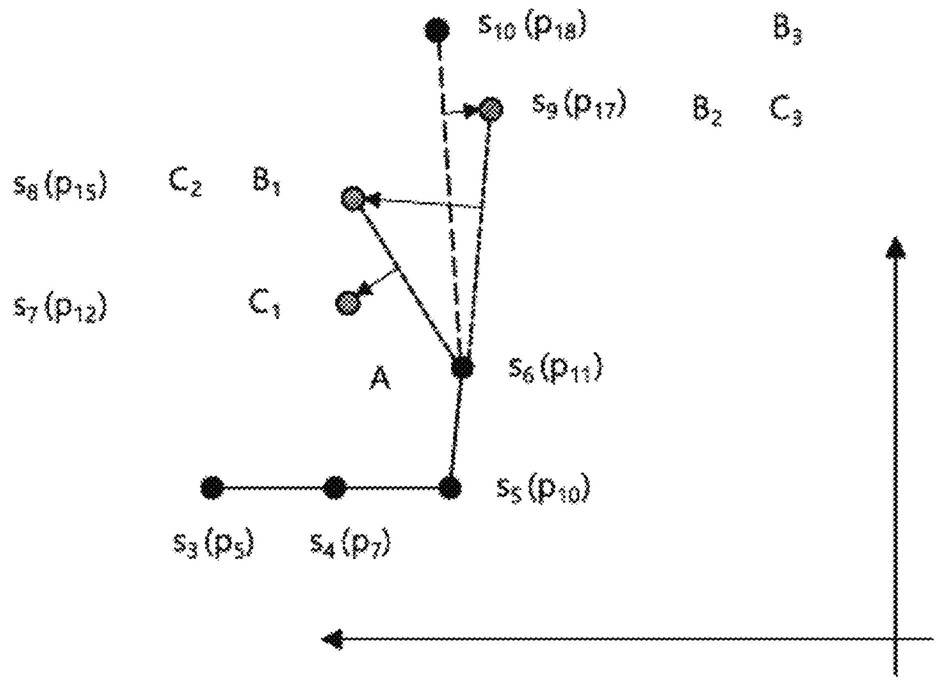

For example, in FIG. 5, to verify the validity of outer point $S_7$ (denoted as $C_1$ and referred to as 'second point'), the position of the second point $C_1$ is checked with respect to the straight line of point $S_6$ (denoted as A and referred to as 'first point') and point $S_8$ (denoted as $B_1$ and referred to as 'third point'). In FIG. 5, because outer point $S_7$ is located outside with respect to the straight line, outer point $S_7$ is provisionally determined as invalid. In here, it is presumed that outer point $S_6$ is already verified as valid.

Because outer point $S_7$ is determined as provisionally invalid, verification for outer points $S_8$ (denoted as $C_2$ and becoming now the second point) is performed in the same manner with outer point $S_6$ maintained as the first point A and outer point $S_9$ (denoted as $B_2$) as the new third point. In FIG. 5, because outer point $S_8$ is located outside with respect to the straight line connecting the first point A and the third point $B_2$, outer point $S_8$ is too provisionally determined as invalid.

Also, because outer point $S_8$ is determined too as provisionally invalid, verification for outer points $S_9$ (denoted as $C_3$ and becoming now the second point) is performed in the same manner with outer point $S_6$ still maintained as the first point A and outer point $S_{10}$ (denoted as $B_3$) as the new third point. In FIG. 5, because outer point $S_9$ is located inside with respect to the straight line connecting the first point A and the third point $B_3$, outer point $S_9$ is determined as valid.

In FIG. 5, the symbol 'S' denotes outer points and P denotes representative points.

For an instance of FIG. 5, as an exemplary computational method for checking whether the second point C is inside or outside with respect to the straight line connecting the first and third points, the equation 1 as below may be used.

To this end, the vehicle 1 may rotationally transform in CCW direction the vector $\overrightarrow{AB}$ of the first point A and the third point B, and then perform an operation calculating a dot product between the transformed vector of $\overrightarrow{AB}$ and a vector $\overrightarrow{AC}$ of the first point A and the second point C, as represented by Equation 1 below.

[Equation 1]

$$y=(X_A Y_{B_i}+X_{B_i} Y_{C_i}+X_{C_i} Y_A)-(Y_A X_{B_i}+Y_{B_i} X_{C_i}+Y_{C_i} X_A)$$

(y: a result value of the dot product operation, $X_A$: an X-coordinate value of A, $Y_{Bi}$: a Y-coordinate value of $B_i$, $X_{Bi}$: an X-coordinate value of $B_i$, $Y_{Ci}$: a Y-coordinate value of $C_i$, $Y_A$: a Y-coordinate value of A, i: integer).

If the second point is located outside, then the dot product results in a positive value, and vice versa.

When the result value of the dot product operation is positive, the second point may be determined to be valid as an outer point, and when the dot product value is negative then the second point may be determined provisionally as invalid.

In process 209, the vehicle 1 may finally determine the outer points for the corresponding building by verifying the validity of each outer point based on the position of the second point with respect to the first straight line connecting the first and thirds points and/or positions of the first point and the third point.

When the vehicle 1 determines that the second point is located inside in process 207 as described above, the vehicle 1 may perform process 2090 as described in FIG. 3 to additionally verify whether the second point is a noise point to be removed.

Referring to FIG. 3, in process 2090, when the vehicle 1 determines that the second point is located inside in process 207, the vehicle 1 may determine whether a distance between the second point and the first straight line connecting the first point and the third point is less than a preset first threshold distance x[m].

The vehicle 1 may perform process 2092 when the distance between the second point and the first straight line is less than the first threshold distance x[m], and otherwise perform process 2094.

Figure 6:
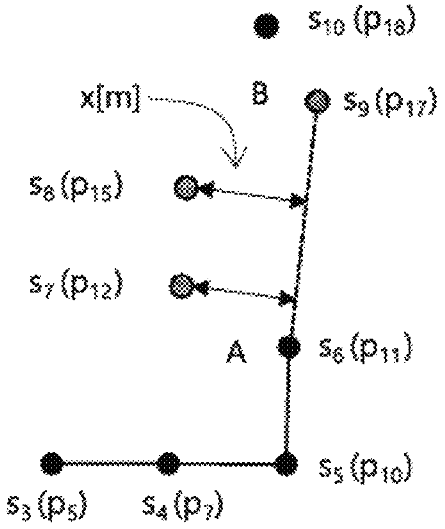

For example, referring to FIG. 6, when $S_7$ and $S_8$ are determined to be $$y=(X_A Y_{B_i}+X_{B_i} Y_{C_i}+X_{C_i} Y_A)-(Y_A X_{B_i}+Y_{B_i} X_{C_i}+Y_{C_i} X_A)$$
$$y=(X_A Y_{B_i}+X_{B_i} Y_{C_i}+X_{C_i} Y_A)-(Y_A X_{B_i}+Y_{B_i} X_{C_i}+Y_{C_i} X_A)$$

located inside, the vehicle 1 may perform process 2092 when a distance between each of $S_7$ and $S_8$ and a first straight line connecting a first point $S_6$ and a third point $S_9$ is less than the preset threshold distance x[m], and otherwise perform process 2094.

In process 2092, the vehicle 1 may determine the second point as a valid outer point.

For example, when, although it is determined in process 207 that the second point is located inside and thus determined provisionally as invalid, the distance between the first straight line and the second point is within the preset threshold distance x[m], the vehicle 1 may finally determine the second point as a valid outer point, not as a noise point.

In process 2094, the vehicle 1 may determine the second point as a noise point which may be reflected from a certain object inside the building.

For example, after determining in process 207 that each of $S_7$ and $S_8$ is located inside, the vehicle 1 may finally determine each of $S_7$ and $S_8$ as the noise point when determining once again that the distance between the straight line and each of $S_7$ and $S_8$ is greater than or equal to the preset threshold distance x[m], as shown in FIG. 6.

In process 2096, when determining the second point as the noise point, the vehicle 1 may delete the second point from the outer points.

The vehicle 1 may perform process 2098, as described in FIG. 3, to determine whether there is one or more representative points to be further added as an outer point(s).

In process 2098, the vehicle 1 may determine whether a ratio of the representative points to the outer points within a second threshold distance from the straight line of the first point and the third point is greater than or equal to a preset threshold ratio.

Figure 7A:
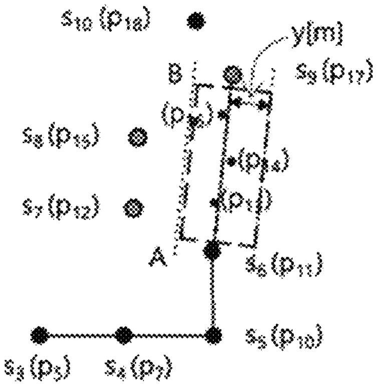

For example, the vehicle 1 may set the second threshold distance y[m] in a direction parallel to the straight line $\overrightarrow{AB}$ connecting the first point A and the third point B as shown in FIG. 7A. In this example, the vehicle 1 may determine whether a ratio of representative points $P_{13}$, $P_{14}$, and $P_{16}$ to outer points located within the second threshold distance y[m] is greater than or equal to the preset threshold ratio.

For example, the vehicle 1 may determine whether the ratio of the representative points $P_{13}$, $P_{14}$, and $P_{16}$ to the outer points located within the second threshold distance y[m] is greater than or equal to the preset threshold ratio Z, using Equation 2 below.

$$\text{Ratio}=\frac{NumofParallel}{B_{Idx}-A_{Idx}-1-PassCount}\geq z? \quad \text{[Equation 2]}$$

($B_{Idx}$: an index number of a representative point matching the point B, $A_{Idx}$: an index number of a representative point matching the point A, PassCount: the number of outer points having a positive result value of Equation 1 among the outer points located within the preset second threshold distance y[m] in the direction parallel to $\overline{AB}$ Numofparallel: the number of representative points located within the second threshold distance y[m] in the direction parallel to $\overline{AB}$, Z: the preset threhsold ratio)

The vehicle 1 may perform process 2100 when the ratio of the representative points to the outer points within the second threshold distance y[m] preset by the positions of the first point and the third point.

In process 2100, the vehicle 1 may add, as new outer points, the representative points within the second threshold distance y[m].

For example, when the ratio of the representative points $P_{13}$, $P_{14}$, and $P_{16}$ to the outer points located within the preset second threshold distance y[m] in the direction parallel to the straight line $\overline{AB}$ connecting the first point A and the third point B is greater than or equal to the preset threshold ratio Z, the representative points $P_{13}$, $P_{14}$, and $P_{16}$ may be considered as missed in extracting outer points in process 205 due to a limitation of the convex hull algorithm.

Figure 7B:
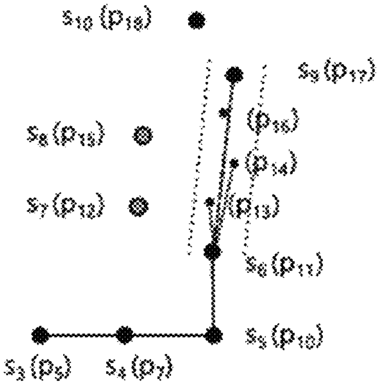

Accordingly, when the ratio of the representative points $P_{13}$, $P_{14}$, and $P_{16}$ to the outer points located within the preset second threshold distance y[m] is greater than or equal to the preset threshold ratio Z in the direction parallel to the straight line $\overline{AB}$ connecting the first point A and the third point B, the vehicle 1 may add (or include) the representative points $P_{13}$, $P_{14}$, and $P_{16}$ as the new outer opints, as shown in FIG. 7B.

Figure 7C:
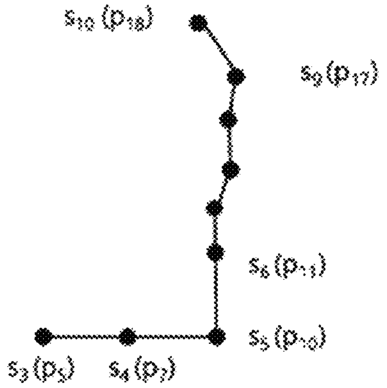

By the processes described above, the vehicle 1 may finally determine final outer points including the representative points $P_{13}$, $P_{14}$, and $P_{16}$ added as the outer points, and output the determined final outer points, with $S_7$ and $S_8$ not included as the outer points, as shown in FIG. 7C.

Processes 207 and 209 described above with reference to FIG. 2 may be applied to all the outer points.

FIGS. 8A, 8B, and 9A-9C are diagrams illustrating an example of a result of extracting an object outline according to the application of the related art and an example of a result of extracting an object outline according to an embodiment of the present disclosure.

Figure 8A:
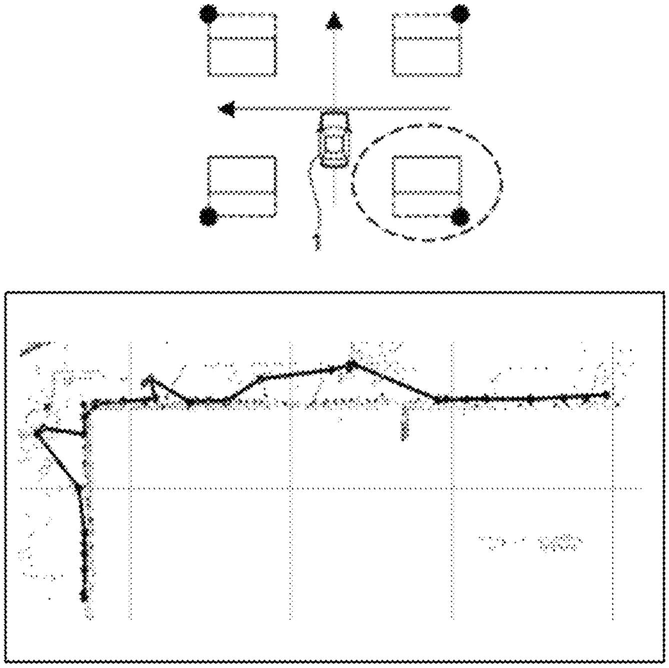
FIGS. 8A, 8B, and 9A-9C are diagrams illustrating an example of a result of extracting an object outline according to the application of the related art and an example of a result of extracting an outline of an object according to an embodiment of the present disclosure.
Figure 8B:
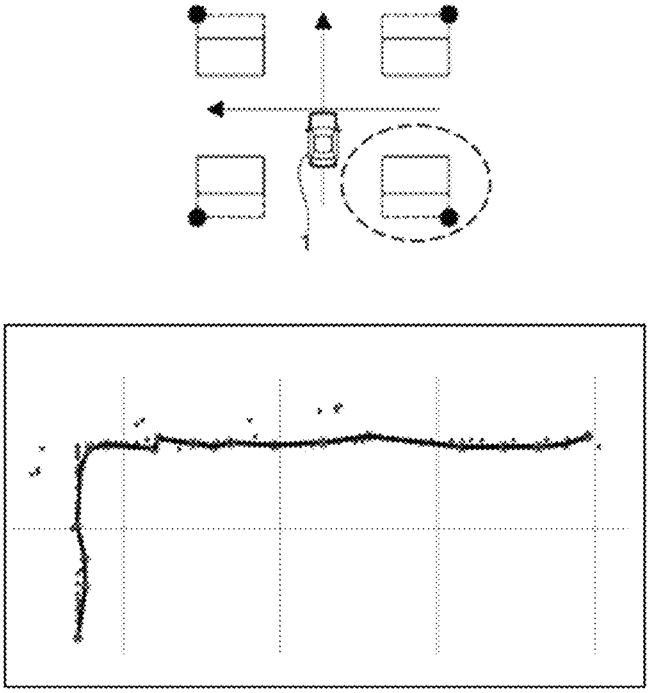

Both FIG. 8A and FIG. 8B show results obtained from a test of extracting an outline of a building located in a third quadrant of global quadrants while the vehicle 1 is traveling. In detail, FIG. 8A shows a result of extracting an object outline by applying a typical method according to the related art, and FIG. 8B shows a result of extracting an object outline according to an embodiment of the present disclosure.

Figure 9A:
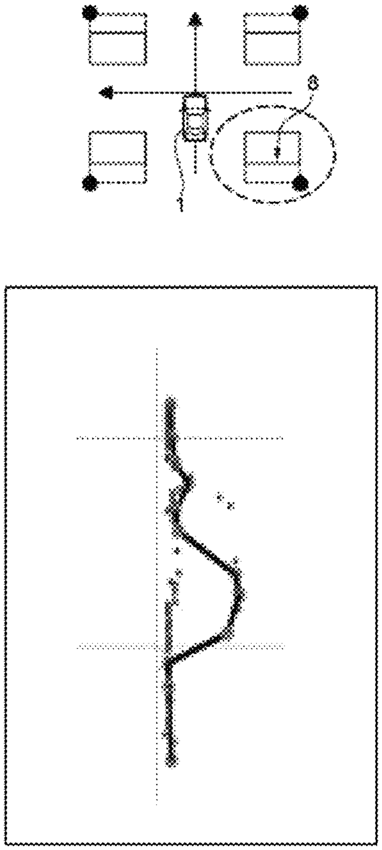
Figure 9B:
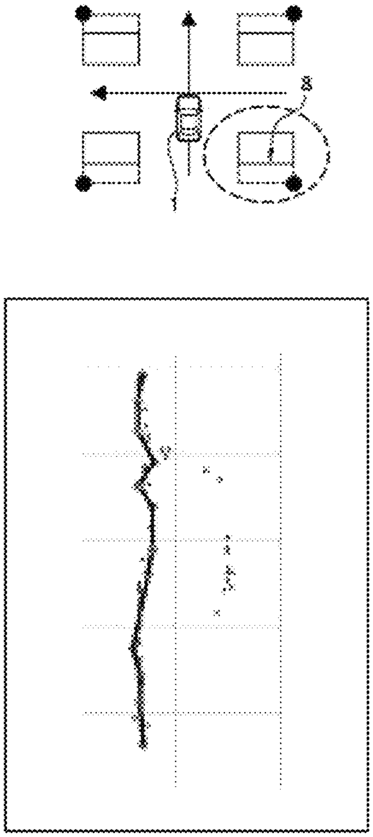
Figure 9C:
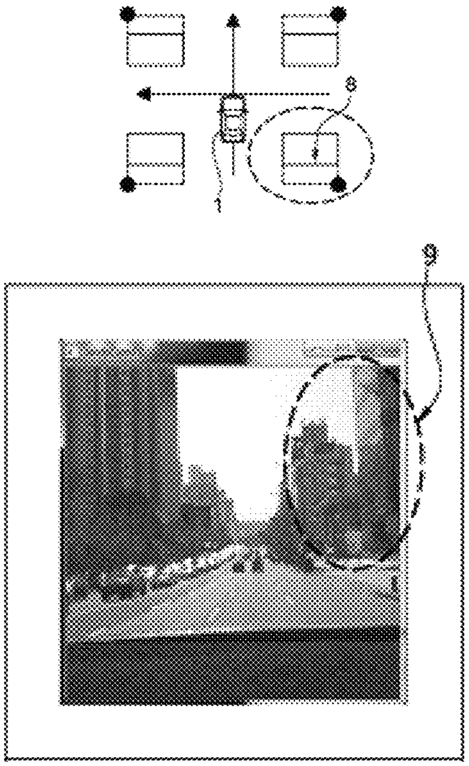

In addition, both FIG. 9A and FIG. 9B show results obtained from a test of extracting an outline of a building 9 located in a third quadrant of global quadrants while the vehicle 1 is traveling. In detail, FIG. 9A shows a result of extracting an object outline by applying a typical method according to the related art, and FIG. 9B shows a result of extracting an object outline according to an embodiment of the present disclosure.

Referring to FIGS. 8A, 8B, and 9A-9C, it is verified that a more accurate outline extracting result may be output according to an embodiment of the present disclosure, compared to the typical method according to the related art.

The present disclosure described above may be embodied as computer-readable code on a medium in which a program is recorded. The computer-readable medium includes all types of recording devices in which data readable by a computer system is stored.

Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, etc.

Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. An object outline extracting method for a vehicle, including:

obtaining, by a lidar sensor mounted on the vehicle, light detection and ranging (lidar) data;

determining, by a controller of the vehicle, object points for an object from the lidar data;

determining, by the controller of the vehicle, a reference point outside a cluster box which encompasses the object points based on positions of the object points in global quadrants of a vehicle coordinate system and an occupancy of the object points in local quadrants of a local coordinate system, the vehicle coordinate system defined based on the vehicle and the local coordinate system defined based on the cluster box; and extracting, by the controller of the vehicle, outer points of the object from the object points based on the reference point.

2. The object outline extracting method of claim 1, further including:

determining a first point, a second point, and a third point among the outer points;

determining a position of the second point with respect to a first straight line connecting the first point and the third point; and determining the second point as a noise point based on the position of the second point with respect to the first straight line.

3. The object outline extracting method of claim 1, wherein the determining of the reference point includes:

when the object points are located within a global quadrant among the global quadrants, and are distributed in three quadrants among the local quadrants and are not in a remaining local quadrant within the global quadrant, determining, as a location of the reference point, a location of a point virtually located in the remaining local quadrant.

4. The object outline extracting method of claim 3, wherein the determining of object points for the object includes:

determining whether the object corresponds to a building with a height greater than or equal to a predetermined height.

5. The object outline extracting method of claim 1, wherein the determining of the reference point is performed when the object points include points located higher than or equal to a predetermined height.

6. The object outline extracting method of claim 1, further comprising extracting representative points among the object points and the extracting-the outer points includes extracting the outer points from the representative points based on the reference point, and wherein the extracting the representative points includes:

changing a scan order of the object points such that the object points are sequentially extracted according to an order of the object points arranged at preset angular intervals in a counterclockwise direction about the reference point in a global quadrant; and as the scan order changes, extracting the object points arranged at the preset angular intervals in the counterclockwise direction as the representative points.

7. The object outline extracting method of claim 2, further comprising extracting representative points and wherein the extracting the representative points includes mapping, to each of the extracted representative points, an index number corresponding to an extraction order of a corresponding representative point, and the extracting the outer points includes extracting the outer points from the representative points.

8. The object outline extracting method of claim 7, wherein the second point is extracted as an outer point after being extracted as a representative point after the first point is extracted and before the third point is extracted, in the extracting the representative points from among the object points.

9. The object outline extracting method of claim 2, wherein the determining the position of the second point with respect to the first straight line includes:

calculating a dot product of a first vector indicated by rotating the first straight line by 90 degrees (°) and a second vector indicating a second straight line connecting the first point and the second point;

when a result value of the dot product is a positive value, determining the position of the second point with respect to the first straight line as an inside of a first object; and when the result value of the dot product is a negative value, determining the position of the second point with respect to the first straight line as an outline part of the first object.

10. The object outline extracting method of claim 9, wherein the determining the second point as the noise point includes:

determining a first distance between the first straight line and the second point; and when the first distance is greater than or equal to a preset first threshold distance, determining the second point as the noise point.

11. The object outline extracting method of claim 1, further comprising:

calculating a ratio of first representative points to first outer points within a second threshold distance that is set according to positions of a first point and a third point; and when the ratio is greater than or equal to a preset threshold ratio, adding the first representative points as the outer points of the object.

12. The object outline extracting method of claim 2, further comprising:

when the second point is determined as the noise point, deleting the second point.

13. A vehicle, comprising:

a light detection and ranging (lidar) sensor; and a controller connected in data communication to the lidar sensor, wherein the controller is configured to perform:

as lidar data is received from the lidar sensor, determining object points for an object from the lidar data;

determining a reference point outside a cluster box which encompasses the object points based on positions of the object points in global quadrants of a vehicle coordinate system and an occupancy of the object points in local quadrants of a local coordinate system, the vehicle coordinate system defined based on the vehicle and the local coordinate system defined based on the cluster box; and extracting outer points of the object from the object points based on the reference point.

14. The vehicle of claim 13, wherein the determining of the reference point includes:

when the object points are located within a global quadrant among the global quadrants, and are distributed in three quadrants among the local quadrants and are not in a remaining local quadrant within the global quadrant, determining, as a location of the reference point, a location of a point virtually located in the remaining local quadrant.

15. The vehicle of claim 13, wherein the controller performs extracting representative points among the object points and the extracting the outer points includes extracting the outer points from the representative points based on the reference point, and wherein the extracting the representative points includes:

changing a scan order of the object points such that the object points are sequentially extracted according to an order of the object points arranged at preset angular intervals in a counterclockwise direction about the reference point in the global quadrant; and as the scan order changes, extracting the object points arranged at the preset angular intervals in the counterclockwise direction as the representative points.

16. The vehicle of claim 13, wherein the controller is configured to perform further:

determining a first point, a second point, and a third point among the outer points;

determining a position of the second point with respect to a first straight line connecting the first point and the third point; and determining the second point as a noise point based on the position of the second point with respect to the first straight line, wherein the second point is extracted as an outer point after being extracted as a representative point after the first point is extracted and before the third point is extracted.

17. The vehicle of claim 16, wherein the determining the position of the second point with respect to the first straight line includes:

calculating a dot product of a first vector indicated by rotating the first straight line by 90 degrees (°) and a second vector indicating a second straight line connecting the first point and the second point;

when a result value of the dot product is a positive value, determining the position of the second point with respect to the first straight line as an inside of a first object; and when the result value of the dot product is a negative value, determining the position of the second point with respect to the first straight line as an outline part of the first object.

18. The vehicle of claim 17, wherein the determining the second point as the noise point includes:

determining a first distance between the first straight line and the second point; and when the first distance is greater than or equal to a preset first threshold distance, determine the second point as the noise point.

19. The vehicle of claim 13, wherein the controller is further configured to:

calculate a ratio of first representative points to first outer points within a second threshold distance that is set according to positions of a first point and a third point; and when the ratio is greater than or equal to a preset threshold ratio, add the first representative points as the outer points of the object.

20. The vehicle of claim 16, wherein the controller is further configured to:

when the second point is determined as the noise point, delete the second point.

* * * * *